Patented June 29, 1954

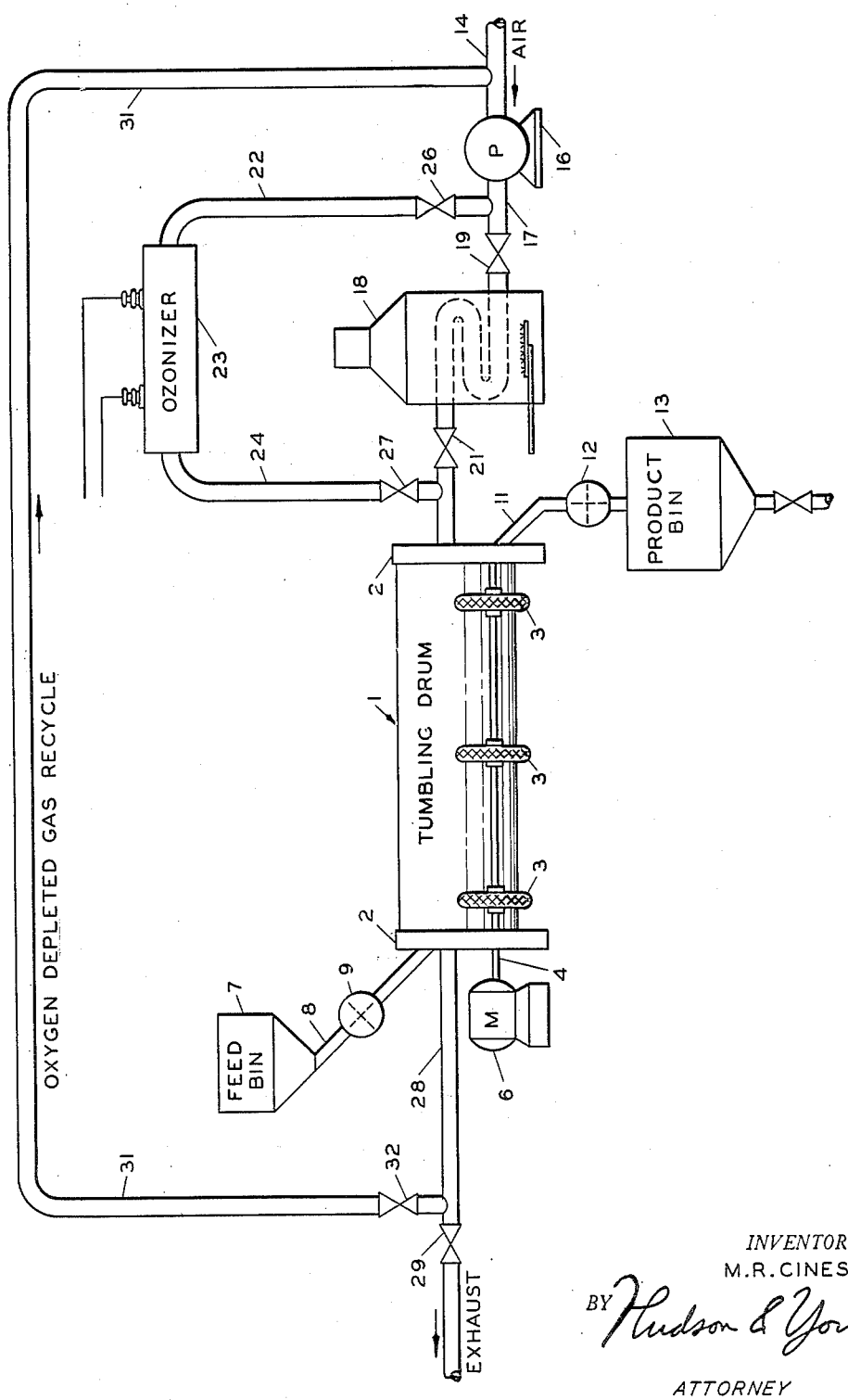

2,682,448

UNITED STATES PATENT OFFICE 2,682,448

PROCESS FOR TREATING HIGH pH FURNACE CARBON BLACK

Martin R. Cines, Bartlesville, Okla., assignor to Phillips Petroleum Company, a corporation of Delaware Application December 28, 1948, Serial No. 67,674

6 Claims. (Cl. 23—209.1)

This invention relates to a method of treating furnace blacks. In a more specific aspect, it relates to a method of reducing the pH of furnace blacks. In another specific aspect, it relates to a method of increasing the scorch time of the furnace blacks. In still another specific aspect, it relates to a method of increasing the hardness of furnace black pellets.

When carbon black first came into prominence for use in the compounding of rubber, almost all of the black was produced by the channel process in which process, natural gas was burned in a deficiency of oxygen and the flame was caused to impinge upon a cool metal surface, whereon the carbon was deposited and from which it was afterwards scraped. Channel blacks are characterized by low pH's long scorch times, ease of pelleting, and hardness of pellets. The pelleting process is generally carried out by rolling the cooled black in a rotating cylinder which causes the agglomeration of the black into hard pellets. These pellets are strong enough that they can be shipped to the rubber compounding plant in hopper cars, and there, can be unloaded and fed into the mixers without any appreciable amount of attrition or disintegration.

However, the methods for producing channel blacks were inefficient and the output was too low to supply the demand. During the late thirties, there came into prominence and wide-spread use a process for making carbon black which permitted the use of gas and/or liquid hydrocarbon feeds and by which it was possible to produce large quantities of carbon black at high yields. This new type of carbon black is generally designated as furnace black and while its properties are superior to channel blacks for some uses, for others they may be somewhat inferior. The principal drawbacks are short scorch time, difficulty of pelleting, and softness of the pellets once they are formed. It is important that the scorch time be sufficiently long to permit all mechanical processing of the rubber mix before vulcanization begins. Furnace blacks are defined as carbon blacks produced by thermal decomposition and reforming and/or partial combustion of hydrocarbons in a reducing atmosphere of furnace gases containing carbon oxides and hydrogen as contrasted with channel black flames burning in an oxygen-containing atmosphere. Furnace blacks are generally characterized by an alkaline pH, greater than 7, while channel blacks have an acid pH, usually less than 6. Furnace blacks are usually hard to pellet, as explained in the following paragraph.

With respect to the pelleting problem, the pellets which can be formed by present methods are so soft that it is impossible to ship them in bulk in hopper cars. Consequently, furnace blacks are, at present, bagged at the plant in 25 pound bags for shipping. Attempts have been made to ship furnace black pellets in hopper cars but the result has been that the pellets disintegrate in transit and arrive at their destination in finely divided or powdered condition. Besides being difficult to handle, this powdery material results in an excessive amount of dust, which is a general nuisance in plant operation. The handling of furnace blacks in paper bags reduces the dust hazzard but greatly increases the handling costs.

I have discovered a method by which it is possible to treat furnace blacks to increase the scorch time and to increase the hardness of the pellets so that they can be shipped in bulk. In my process, I subject the furnace black, either loose or pelleted, to a current of oxidizing gas to produce a certain amount of controlled oxidation of the black without causing any appreciable loss of black from combustion.

It is, therefore, an object of my invention to provide a method of treating furnace blacks.

It is another object of my invention to provide a method of lowering the pH of furnace blacks.

It is another object of my invention to provide a method of increasing the scorch time of furnace blacks.

It is still another object of my invention to provide a method of increasing the hardness of furnace black pellets.

It is still another object of my invention to provide a method of producing hard furnace black pellets.

Other objects and advantages of my invention will be apparent to those skilled in the art from a reading of the following detailed description and drawing.

The drawing is an elevational view of an apparatus which is adapted to the carrying out of my invention.

In the single drawing, a tumbling drum or pelleter, generally designated as 1, having end closures 2, is provided with rollers 3 disposed on shaft 4 rotated by motor 6 for rotating the drum. Material feed bin 7 is provided for introducing the material through line 8 and star valve 9 into tumbling drum 1. Treating material is removed from said tumbling drum by means of line 11 and star valve 12 into product bin 13. Air intake line 14 leads to pump 16, the effluent from which may be blown to tumbling drum 1 through line 17, which passes through heater 18. Alternately, valves 19 and 21 in line 17 may be manipulated so as to cause the air to flow from pump 16 through line 22 into ozonizer 23 and from thence through line 24 back into line 17 and into tumbling drum 1. Valves 26 and 27 are provided in lines 22 and 24 for controlling the flow of air through ozonizer 23. The oxygen-depleted air or gas is removed from tumbling drum 1 through conduit 28 and may be allowed to exhaust to the atmosphere through valve 29 or, as desired, a portion of it may be recycled through recycle line 31 and valve 32 to air intake 14.

OPERATION

In the single figure drawing, my apparatus is represented as being equipped with an ozonizer and a heating furnace with proper valves and piping to allow use of either method. It is obvious that the apparatus could be set up to operate entirely on an ozonized stream or on a heated oxygen-containing stream.

In the practice of my invention, I subject the furnace black feed, either as loose black or as pellets to controlled oxidizing conditions which results in a minimum amount of oxidation to carbon dioxide consistent with the desired amount of pellet hardening, pH reduction, and scorch time increase. If the feed material is pelleted furnace black, tumbling drum 1 performs the function of bringing about intimate contact between the oxidizing gas flowing therethrough and the pellets flowing in countercurrent direction. This tumbling drum may be provided with means, such as vanes extending interiorly, to increase the agitation of the pellets and thereby insure more intimate contact with the gases.

In the modification wherein the oxidizing gas is heated air of normal or reduced oxygen content, air is picked up from the outside atmosphere through an air intake and mixed with sufficient oxygen depleted recycle gas to adjust the oxygen content as desired. This mixture is blown through a heater where it is raised to the desired temperature and from there it is blown into the tumbling drum.

While, in certain types of apparatus wherein the transfer and distribution of the heat is good, it is possible to use undiluted air as an oxidizing gas without excessive burning of the carbon, with other types of apparatus, it is sometimes desirable to use air having a reduced oxygen content. A good method for reducing the oxygen content of the air to the desired level is to recycle the oxygen depleted gas through line 31 and bring into the system only enough fresh air to give a gas of the desired oxygen content.

While my process using air of normal or reduced oxygen content is operable at temperatures ranging from 400 to 1200° F., the preferred temperature range is 650 to 1000° F. The length of treating time, temperature and the oxygen content of the treating gas are interdependent. Generally, the treating effect for a given length of time increases with increasing temperature. In this temperature range with one hour's exposure, it is possible to obtain a pH reduction of 4 to 5 units with the loss of not more than 2 per cent of the carbon by oxidation.

In efficient apparatus, it appears that the loss of black is a function only of the final state of oxidation of the surface and not of the temperature level or oxygen concentration. However, less efficient apparatus may increase this loss.

While it is possible to operate with undiluted air at these elevated temperatures, the amount of carbon lost through oxidation may become considerable, especially at the higher temperatures. Generally, I prefer to operate at these elevated temperatures with diluted air having an oxygen content between 2½ and 5 per cent by recycling the oxygen-depleted gas and introducing only enough fresh air to adjust the oxygen content to the predetermined value. The amount of fresh gas is generally small compared with the amount of recycled gas and the heating necessary to raise the new gas to the desired temperature is small.

Instead of using pelleted black as a feed, the raw black may be used as a feed, in which case the tumbling drum is a conventional pelleting apparatus. By operating with the raw black, the pelleting and treating occurs in a single apparatus. Where conditions permit, this is the preferable manner of operating because of the amount of equipment eliminated.

The time of residence of the furnace black fed in the tumbling drum in contact with the oxidizing gas will vary somewhat with the condition of the feed and with the temepratures used. In the range of 700 to 800° F. and with a gas having an oxygen content of 2½ to 10 per cent, the desired treating can be brought about in about one hour.

Instead of operating at elevated temperatures with air as the oxidizing gas, I may bring pure air into the system, pass it through an ozonizer and then pass the ozonized air into the tumbling drum at whatever temperature it attains. Generally, this temperature will be atmospheric or slightly above atmospheric, probably 80 to 100° F. The ozonizer may be any conventional type high frequency discharge apparatus which is used for ozonizing air.

While the desired treating effect has been sometimes referred to as lowering the pH and sometimes referred to as hardening of the pellets, it is to be understood that my invention is a method of treating furnace blacks to lower the pH, increase the hardness of the pellets, increase the ease of pelleting, and increase the scorch time. It has been determined that a high pH is indicative of short scorch time and soft pellets. Therefore, if the pH is adjusted to a proper value by this process, the black will exhibit the desired improvement in the other characteristics. Furnace blacks generally have a pH between 9 and 10, while channel blacks have a pH of about 3 to 4. I have discovered that if sufficient oxidation of the black is effected to lower the pH to some value below 7, the resulting black will generally have acceptable properties. However, I prefer to treat the black in such a way that the pH is lowered to some value below 5.5.

The exact mechanism by which the oxidation treatment brings about the desired improvement in the furnace black characteristics is not completely understood. It is possible that the oxygen treatment results in the formation of carbon-oxygen complex on the surface which gives the desired pH lowering.

Furnace blacks are generally designated by terms which indicate the properties imparted to rubber by the individual black. Generally speaking, the most important of the furnace blacks, are the high modulus furnace (HMF) black, high abrasion resistance furnace (HAF) black, semi-reinforcing furnace (SRF) black, and thermal blacks, such as acetylene black. While the individual blacks may exhibit variations in properties, they, as a class, exhibit the same general properties of high pH, short scorch time, and difficulty of pelleting or agglomerating.

As representative of the furnace blacks, for the purpose of performing specific tests, I have chosen a high modulus furnace black and a high abrasion resistance furnace black. These blacks generally exhibit the properties and characteristics indicated by the following analysis:

|  | HMF black | HAF black |
| --- | --- | --- |
| pH | 9.7 | 9.1 |
| Particle diameter: |  |  |
| mean mu | 51.0 | 34.5 |
| mode mu | 45.0 |  |
| Surface area N₂ adsorption method | 39.5 | 82.4 |
| Percent volatile matter | 1.13 | 1.13 |
| Stiff paste oil adsorption cc./gm | 1.25 | 1.20 |
| Tint | 114 | 174 |
| Mineral oil color test | 94 | 124 |
| Iodine No. (mg./gm.) | 41.0 | 91.2 |
| DPG Number | 4.2 | 11.3 |
| Acid Number | 23.3 | 24.0 |
| Heat of wetting, cal./gm | 0.64 | 1.71 |
| Ash | 0.118 | 0.156 |
| Density: |  |  |
| Helium method | 1.95 | 1.98 |
| Acetone method | 1.806 | 1.808 |

For purposes of illustration, I have included tests on these two blacks in loose and pelleted form. Since furnace blacks as a class exhibit the same general properties, it is believed unnecessary to lengthen the specification to include tests on every known furnace black as I have found my method operates successfully on all types of furnace blacks.

TESTS

The specific tests described hereafter were carried out on said samples of loose and pelleted HMF and HAF blacks.

The oxidations of Tests 1 and 10 were carried out in a rotating glass cylinder into which a stream of oxidizing gas was introduced along the axis. The cylinder was equipped with a squirrel cage to insure intimate contact between the gas and black. The predetermined temperature was maintained by suitable control.

The pH determinations were made by a standard test as follows: One gram of the black was placed in 25 ml. of water, boiled for fifteen minutes, and allowed to cool to room temperature after which the water was decanted and the pH of the remaining sludge was measured with a Beckman pH meter.

Unfortunately, no satisfactory mechanical test has been devised for making a quantitative measurement of the hardness of pellets to accurately indicate the resistance of such pellets to attrition from shocks during actual handling. The best method, the one used here, for determining the hardness is performed by placing a pellet in the palm of one hand and applying pressure with a finger. A person with experience with carbon black can readily ascertain the relative hardness of pellets by this method.

Another hardness test is to place a few pellets in a metal container and observe the rattle produced when the can is shaken.

Test 1

A number of runs were made with pelleted HMF black in the apparatus just described at the temperature indicated, using air as the oxidizing gas except in the control test wherein nitrogen was used instead of air. The results are as listed below. The initial sample had a pH between 9.0 and 10.0 and formed soft pellets. The designations under the heading of "Hardness" indicate the relative hardness of the pellets.

| Sample | Treating Temperatures | Treating Time, Min. | pH | Hardness |
| --- | --- | --- | --- | --- |
| Blank | 630 | 60 |  | Soft. |
| 1 | 640 | 30 | 9.1 | Soft+. |
| 2 | 650 | 2 | 9.3 | Do. |
| 3 | 785 | 90 | 6.8 | Do. |
| 4 | 790 | 60 | 7.0 | Hard−. |
| 5 | 837 | 75 | 5.6 | Do. |
| 6 | 837 | 60 | 6.2 | Do. |
| 7 | 838 | 30 | 7.7 | Soft. |
| 8 | 838 | 120 | 4.4 | Hard. |
| 9 | 839 | 90 | 4.9 | Do. |
| 10 | 973 | 25 | 5.6 | Do. |
| 11 | 1,028 | 16 | 6.4 | Do. |

Test 2

A Mooney scorch time (a standard test) was run on samples of untreated HMF pellets, treated HMF pellets, HAF pellets, and a channel black sample, the results being as follows:

| Sample | pH | Mooney Scorch Time, minutes |
| --- | --- | --- |
| Untreated HMF pellets | 8–10 | 18.5 |
| Treated HMF pellets #1 | 5.1 | 28–29 |
| Treated HAF pellets #2 | 2.9 | 43 |
| Channel black sample | 3–5 | >30 |

Test 3

The effect of oxidation time on the pH of pelleted HMF was investigated at 745° F. and 815° F. These tests indicate that most of the pH reduction occurs during the first hour at these temperatures.

| Time, Min. | 745° F., pH | 815° F., pH |
| --- | --- | --- |
| 0 | 9.3 | 9.3 |
| 15 | 8.6 | 7.0 |
| 30 | 7.6 | 6.1 |
| 45 | 7.6 | 5.6 |
| 60 | 7.2 | 4.3 |
| 90 | 6.8 | 3.5 |

Test 4

In tests using pelleted HMF and HAF blacks, it was found to be difficult to effect the desired pH reduction without excessive burning of the black if undiluted air were used. Tests were run using undiluted air with loose HMF black and nitrogen-diluted air of the indicated oxygen content with the pelleted samples, and a one hour treating time. Results were as follows:

LOOSE HMF USING AIR

| Temperature, ° F. | pH |
| --- | --- |
| Untreated | 8.9 |
| 432 | 7.7 |
| 457 | 7.6 |
| 572 | 7.4 |
| 608 | 7.1 |
| 667 | 6.7 |
| 702 | 5.6 |
| 707 | 4.6 |
| 752 | 3.3 |
| 828 | 3.1 |
| 921 | 3.3 |
| 1,044 | 3.5 |

PELLETED HMF—OXYGEN CONTENT OF GAS, 10 PERCENT

| Temperature, ° F. | pH |
|---|---|
| Untreated | 9.3 |
| 565 | 8.7 |
| 648 | 7.7 |
| 725 | 6.2 |
| 738 | 5.4 |
| 759 | 4.7 |
| 797 | 4.0 |
| 817 | 4.3 |

PELLETED HAF—OXYGEN CONTENT OF GAS, 2.5 PERCENT

| Temperature, ° F. | pH |
|---|---|
| Untreated | 9.9 |
| 666 | 7.2 |
| 716 | 7.1 |
| 752 | 5.5 |
| 770 | 4.8 |
| 817 | 4.6 |

These data show that, up to about 800° F., the pH reduction increases with an increase in treating temperatures. The change in pH with change in temperature was greatest in the range 700–800° F.

Test 5

The amount of black burned during the treating operation was tested by determining the amount of $CO_2$ evolved by the treatment. This was done by removing any $CO_2$ from the feed gas and determining the amount of $CO_2$ in the effluent gas. The results for a one hour treating period were as follows:

LOOSE HMF

| Temperature, ° F. | Mole Percent $CO_2$ |
|---|---|
| 457 | 0.01 |
| 502 | 0.03 |
| 637 | 0.06 |
| 684 | 0.38 |
| 725 | 0.48 |
| 768 | 1.36 |

PELLETED HMF

| Temperature, ° F. | Mole Percent $CO_2$ |
|---|---|
| 614 | 0.13 |
| 678 | 0.28 |
| 738 | 0.48 |
| 828 | 0.98 |

PELLETED HAF

| Temperature, ° F. | Mole Percent $CO_2$ |
|---|---|
| 588 | 0.25 |
| 652 | 0.37 |
| 687 | 0.58 |
| 762 | 1.35 |
| 800 | 3.48 |

These data reveal that the rate of $CO_2$ formation increases sharply between 700° F. and 800° F. This corresponds to the range of maximum change in pH with change in temperature. Considered with those data of Test 4, they show that a pH reduction of 5 units can be effected with the loss of less than one per cent of carbon from both loose and pelleted HMF samples and the pH of pelleted HAF can be correspondingly lowered with the loss of less than two per cent of the carbon.

Since the carbon loss is measured by the amount of $CO_2$ evolved, it is not a determination of the loss in weight of the sample because oxygen is known to combine to some extent with the carbon remaining, and may partially or completely balance the loss in weight resulting from the loss of carbon.

Test 6

Samples of pelleted HMF and HAF blacks were treated at atmospheric temperature with air which had been passed through a semi-corona type electrical discharge. The sample to be tested was placed inside an upright glass tube having a fritted disc in the lower end on which the sample rested and through which the treated air was blown.

The discharge tube was of such construction as to produce a semi-corona type discharge, the principal reaction product on the passage of air therethrough being ozone.

The samples were treated with a predetermined volume of ozonized air, after which the pH was determined. The following data show the relation between change in pH and the volume of ozonized air with which the samples were treated. Samples weighing 30–35 gms. were used.

Since the surface area of the HMF black is 77.0 square meters per gram and that of the HAF black is 37.3, the following table includes a column showing, for sample HAF, the amount of air for a total surface area equivalent to that of the HMF sample.

| Sample HMF | | Sample HAF | | |
|---|---|---|---|---|
| Vol. air | pH | Vol. air | pH | Vol. air for area equal to HMF sample |
| 2.5 | 9.5 | 5.0 | 9.4 | |
| 5.0 | 8.7 | 7.5 | 8.8 | |
| 7.5 | 8.0 | 10.0 | 8.6 | 4.8 |
| 8.75 | 7.3 | 15.0 | 7.6 | 7.3 |
| 10.0 | 6.7 | 20.0 | 6.8 | 9.7 |
| 12.5 | 5.3 | 25.0 | 5.7 | 12.1 |
| 15.0 | 4.3 | 30.0 | 4.6 | 14.5 |
| 17.5 | 3.6 | 35.0 | 3.8 | 16.9 |
| 20.0 | 3.3 | 40.0 | 3.5 | 19.4 |
| 24.0 | 3.2 | | | |

Test 7

The hardness of the pellets of each sample from Test 6 was tested and it was found that there was a distinct increase in hardness with the decrease in pH below a value of about 7.

Test 8

The surface areas of five samples of treated pellets from Test 6, having pH's varying from 7.7 to 3.5 were determined by the nitrogen adsorption method. It was found that no appreciable change in surface area resulted from the treatment.

Test 9

Mooney scorch tests were run on one of the treated samples and on the untreated sample from Test 6. The scorch time was found to have been increased as much as 28% by treatment.

Test 10

In order to test the compound properties of furnace blacks treated by my oxidation process, samples of the blacks which had been previously treated with air containing 10 per cent oxygen at the temperatures and for the length of time indicated hereafter were evaluated in the following recipe:

| | |
|---|---|
| #1 smoked sheet | 100 |
| Black | 50 |
| Zinc oxide | 4 |
| Asphalt #6 | 6 |
| Sulfur | 2.5 |
| Captax | 0.5 |
| Stearite | 3 |
| PBNA | 1.5 |

The various physical tests indicated in the table below were run with the following results:

| Black | Oxidation | | pH | Minutes' Cure at 307° F. | 80° F. | | Extrusion at 195° F., In./Min. | Minutes at 250° F. to Scorch |
|---|---|---|---|---|---|---|---|---|
| | Temp., °F. | Minutes | | | 300% Modulus | Tensile | | |
| Sample 1 | | | 9.7 | 20 | 1,580 | 3,100 | 57.5 | 7.5 |
| Sample 2 | 785 | 90 | 6.8 | 23 | 1,460 | 2,600 | 59.5 | 14.5 |
| Sample 3 | 850 | 22 | 6.2 | 24 | 1,430 | 2,970 | 61.5 | 15.5 |
| Sample 4 | 845 | 60 | 5.8 | 24 | 1,330 | 2,950 | 60.5 | 16.5 |
| Sample 5 | 860 | 60 | 5.5 | 25 | 1,370 | 2,900 | 60.5 | 18.5 |
| Sample 6 | 839 | 90 | 4.9 | 25 | 1,450 | 3,000 | 59.5 | 17.0 |
| Sample 7 | 838 | 120 | 4.4 | 26 | 1,380 | 2,860 | 58.5 | 19.5 |
| Sample 8 | 838 | 240 | 3.0 | 29 | 1,270 | 2,720 | 59.5 | 25.5 |

It is to be understood that the foregoing examples are by way of illustration only and that various obvious modifications or substitutions may be made without departing from the spirit of the invention, the scope of which is defined by the following claims.

Having described my invention, I claim:

1. A process for treating furnace carbon black having a pH from 9 to 10 which comprises: passing said furnace carbon black into a pelleting zone; passing a free oxygen-containing gas having an oxygen content of from 2.5 to 10 volume per cent into said pelleting zone; therein pelleting and directly contacting said furnace carbon black with said oxygen-containing gas at a temperature of from 650 to 1000° F. and for a period of time sufficient to reduce the pH of said furnace carbon black to a value of from 2.9 to 7; and withdrawing resulting furnace carbon black pellets from said pelleting zone.

2. A process for treating high pH furnace carbon black which comprises: passing said furnace carbon black into a pelleting zone; passing a free oxygen-containing gas into said pelleting zone said free oxygen containing gas having less than the normal amount of oxygen present in air; therein pelleting and directly contacting said furnace carbon black with said oxygen-containing gas at a temperature of from 400° F. to 1200° F. for a period of time within the range of between 16 and 120 minutes sufficient to reduce the pH of said furnace carbon black to a value of from 2.9 to 7; and withdrawing resulting furnace carbon black pellets from said pelleting zone.

3. The process for treating high pH furnace carbon black which comprises: passing said furnace carbon black into a pelleting zone; passing a current of ozonized air into said pelleting zone; therein pelleting and directly contacting said furnace carbon black with said ozonized air for a period of time sufficient to reduce the pH of said furnace carbon black to a value of from 2.9 to 7; and withdrawing resulting furnace carbon black pellets from said pelleting zone.

4. A process for treating high pH furnace carbon black which comprises, passing said furnace carbon black into a pelleting zone; passing a current of ozonized air into said pelleting zone at a temperature of from 80° F. to 100° F. for a period of time sufficient to reduce the pH of said furnace carbon black to a value of from 2.9 to 7; and withdrawing resulting hardened furnace carbon black from said pelleting zone.

5. A method of treating a furnace black which comprises intimately contacting said black with a current of gas having a free oxygen content of 2.5 volume per cent to 10 volume per cent at a temperature between 650° F. and 1000° F. for a period of time sufficient to reduce the pH of said black to a pH value between 2.9 and 7.0.

6. A method of treating a furnace black having a pH above 7.0 which comprises intimately contacting said black with a current of gas having a free oxygen content of 2.5 volume per cent to 10 volume per cent at a temperature between 650° F. and 1000° F. for a period of time sufficient to reduce the pH of said black to a pH value between 2.9 and 7.0.

References Cited in the file of this patent

UNITED STATES PATENTS

| Number | Name | Date |
|---|---|---|
| Re. 19,644 | Damon | Aug. 13, 1935 |
| 2,131,686 | Heller et al. | Sept. 27, 1938 |
| 2,317,026 | Brown et al. | Apr. 20, 1943 |
| 2,393,106 | Johnson et al. | Jan. 15, 1946 |
| 2,422,989 | Skoog | June 24, 1947 |
| 2,479,708 | Amon | Aug. 23, 1949 |

FOREIGN PATENTS

| Number | Country | Date |
|---|---|---|
| 118,922 | Australia | Sept. 5, 1944 |

OTHER REFERENCES

Mantell: Industrial Carbon (sec. ed.), 1946, D. Van Nostrand Co., N. Y., pages 61–63.

Sweitzer et al.: The Rubber Age, vol. 55, No. 5, August 1944, page 472.

Braendle et al.: India Rubber World, vol. 119, No. 1, New York, October 1948, pages 57–62.

Zapp: Industrial and Engineering Chemistry, vol. 36, No. 2, February 1944, pages 128–133.